United States Patent [19]

Fujii et al.

[11] Patent Number: 5,322,894

[45] Date of Patent: Jun. 21, 1994

[54] BLENDED POLYPROPYLENE-EPOXY GROUP CONTAINING COPOLYMER THERMOPLASTIC RESIN COMPOSITIONS

[75] Inventors: Takeshi Fujii, Chiba; Masashi Yamamoto, Ichihara, both of Japan

[73] Assignee: Sumitomo Chemical Company, Limited, Osaka, Japan

[21] Appl. No.: 647,270

[22] Filed: Jan. 29, 1991

[30] Foreign Application Priority Data

Jan. 30, 1990 [JP] Japan .................. 2-020988

[51] Int. Cl.⁵ .................. C08L 23/00; C08L 63/00
[52] U.S. Cl. .................. 525/93; 525/207; 525/208
[58] Field of Search .................. 525/207, 208, 93

[56] References Cited

U.S. PATENT DOCUMENTS 4,528,329  7/1985  Inoue et al. .................. 525/74
4,962,157 10/1990  Taubitz et al. .................. 525/92

FOREIGN PATENT DOCUMENTS 0180302  5/1986  European Pat. Off. .
0317358  5/1989  European Pat. Off. .
0337214 10/1989  European Pat. Off. .

OTHER PUBLICATIONS

Patent Abstracts of Japan, vol. 13, No. 179 (C-590)[3527], Apr. 26, 1989; & JP-A-01 009 254 (Nippon Petrochem) Dec. 1, 1989.

*Primary Examiner*—John Kight, III
*Assistant Examiner*—Jeffrey Culpeper Mullis
*Attorney, Agent, or Firm*—Stevens, Davis, Miller & Mosher

[57] ABSTRACT

A thermoplastic resin composition of the present invention contains at least one modified polypropylene resin or resin composition and an epoxy group-containing copolymer, which thermoplastic resin composition is suitably usable where a high-level balance among the properties is required, since said composition has easy processability into molded articles, films and sheets and can give products having well balanced properties among stiffness, heat resistance, impact resistance, scratch resistance, coatability, oil resistance, chemical resistance, water resistance, etc. and having excellent appearance, uniformity and smoothness.

27 Claims, 1 Drawing Sheet

BLENDED POLYPROPYLENE-EPOXY GROUP CONTAINING COPOLYMER THERMOPLASTIC RESIN COMPOSITIONS

The present invention relates to a novel thermoplastic resin composition which is utilizable in the form of molded articles, sheets, films, etc., by means of injection molding, extrusion molding, etc.

More specifically, the present invention relates to a thermoplastic resin composition having an excellent balance of physical properties and an excellent appearance, which is obtained by blending a polypropylene resin with an epoxy group-containing copolymer.

Polypropylenes have heretofore been widely used in the form of molded articles, films, sheets, etc., since they are excellent in molding processability, toughness, water resistance, and gasoline resistance, chemical resistance, have a low specific gravity and are inexpensive.

Polypropylenes, however, are poor in heat resistance, stiffness, impact resistance, scratch resistance, coatability, adhesive properties, printability, etc., and should be improved in these properties. The defect is an obstacle to the introduction thereof into new areas of practical use.

For the purpose of improving the coatability, adhesive properties, printability, etc., of the above JP-B-58-47418 and JP-A-58-49736, etc., propose a method of partially or wholly modifying a polypropylene with an unsaturated carboxylic acid or an anhydride thereof such as maleic anhydride.

Further, for the purpose of improving the impact resistance, it is known and is general practice to incorporate an impact resistance-improving agent into a polypropylene (Horie and Goto: Japan Rubber Society Journal, 42, 10 (1969), Imoto: Text for the 11th Kokenkai, p. 451 (1967), Yasuno and Okita: Plastic Age, 15, No. 2 (1969), JP-B-43-3964, JP-B-38-10341, JP-B-39-10640, JP-B-39-18746, JP-B-42-9011, JP-B-43-6795, Chem. Abst., 65,20293a (1966), U.S. Pat. No. 3,291,862 (1966), R. Longwooth, D. L. Funk: J. Polym. Sci., 10, 1612 (1966), Brit. P., 850568 (1963), Belg. P., 611727 (1963), Brit. P., 1113380 (1968), Ger. P., 1051493 (1963), Ger. P., 688578 (1963), Brit. P., 846695 (1963), Neth. Appl., 6414705 (1964), Belg. P., 634842 (1964), Can. P., 705481 (1964), U.S. Pat. No. 3210323 (1965), Fr. P., 1540243 (1968), Fr. P., 1533021 (1968)).

However, the methods disclosed in the above publications have achieved no essential improvement in balanced properties since stiffness and heat resistance are degraded, although impact resistance is improved.

From such a viewpoint, a wide new area of use is expected if a thermoplastic resin composition having an excellent balance in properties can be obtained by incorporating an impact resistance-improving agent into a polypropylene.

However, a molded article produced from a mere mixture of a polypropylene with an impact resistance-improving agent has a problem in that its stiffness, heat resistance, etc., are degraded, although its mechanical properties, impact resistance and tensile elongation in particular are improved.

A thermoplastic resin composition for use in automobile parts and electric and electronic parts is required to have a high-level balance in properties such as stiffness, heat resistance, impact resistance, etc. As a result of a diligent study, the present inventors have completed the present invention.

According to the present invention, there is provided a thermoplastic resin composition which comprises 100 parts by weight of at least one modified polypropylene resin or resin composition (D) selected from the group consisting of:

a modified polypropylene (A) prepared by the graft-polymerization of an unsaturated carboxylic acid or a derivative thereof onto a polypropylene (C), a modified polypropylene (B) prepared by the graft-polymerization of an unsaturated carboxylic acid or a derivative thereof and an unsaturated aromatic monomer onto a polypropylene (C), a modified polypropylene composition (A') prepared by the graft-polymerization of an unsaturated carboxylic acid or a derivative thereof onto a mixture of a polypropylene (C) and a rubbery substance (F), and a modified polypropylene composition (B') prepared by the graft-polymerization of an unsaturated carboxylic acid or a derivative thereof and an unsaturated aromatic monomer onto a mixture of a polypropylene (C) and a rubbery substance (F), and 0.1 to 300 parts by weight of an epoxy group-containing copolymer (E).

Figure 1:
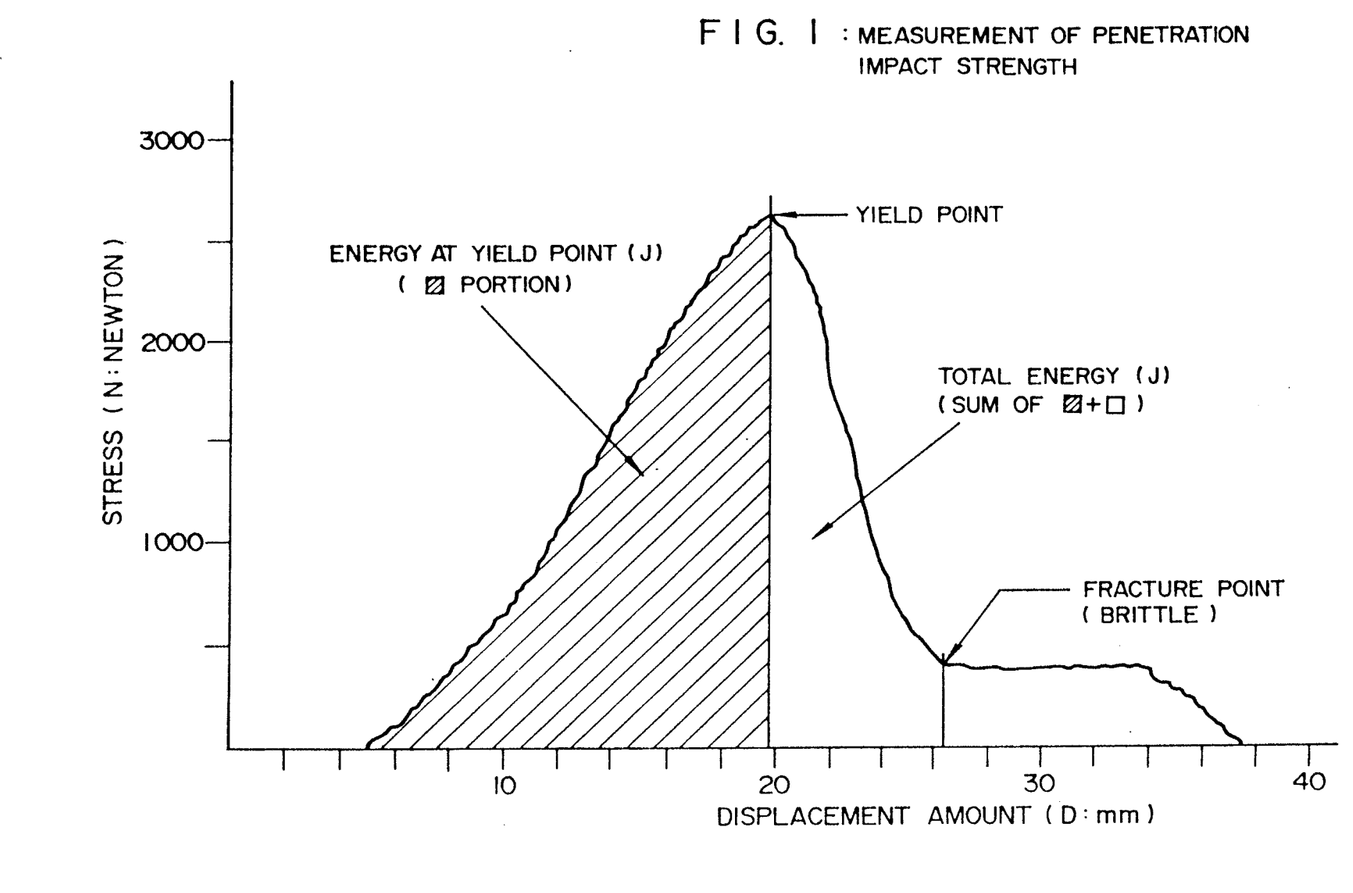
FIG. 1 shows one example of measurement charts for evaluating penetration impact strength, in which the abscissa axis indicates a diplacement amount (D: mm) for deformation of a test piece and the ordinate axis indicates a stress (N: newton) to a displacement amount.

A yield point is a point where a stress to a displacement amount changes from increasing to decreasing, and a breaking point is a point where a material is fractured and a change in a stress disappears.

A yield point energy is an area integration of a displacement amount and stress from the start of stress detection to a yield point of a material, and a total energy is an area integration of a displacement amount and stress from a start to the breaking point.

The polypropylene will be explained hereinafter. The term "polypropylene" used in the present specification refers to a material used for preparing each of the modified polypropylenes (A) and (B) and the modified polypropylene compositions (A') and (B'), or it refers to the polypropylene (C).

In the present invention, the "polypropylene" is a crystalline polypropylene. It includes a homopolymer of propylene, a block copolymer prepared by polymerizing propylene in the first step and copolymerizing ethylene with an α-olefin such as propylene, butene-1 or the like in the second step, and a random copolymer prepared by copolymerizing propylene with α-olefin such as ethylene, butene-1 or the like.

The homopolymer and block or random copolymer of propylene can be generally obtained, e.g. by polymerization in the presence of a catalyst formed from a combination of titanium trichloride with an alkylaluminum compound, which is the so-called Ziegler-Natta catalyst.

The polymerization can be carried out at a temperature between 0° C. and 300° C. However, when high-stereoregularity polymerization of an α-olefin such as propylene, etc., is carried out, a polymer having high stereoregularity cannot be obtained at a temperature of more than 100° C. For this reason and some others, the polymerization is carried out preferably at a temperature between 0° C. and 100° C.

The polymerization pressure is not critical, and can be desirably selected from 3 to 100 atmospheric pressure from an industrial and economical point of view.

The polymerization can be carried out according to either a continuous method and a batch method.

The polymerization method can be selected from a slurry polymerization method using an inert hydrocarbon solvent such as butane, pentane, hexane, heptane, octane, or the like; a solvent polymerization method in which a resulting polymer is dissolved in said inert hydrocarbon solvent; a solventless bulk polymerization method in which a liquefied monomer is polymerized; and a gas phase polymerization method in which a gaseous monomer is polymerized.

In order to regulate the molecular weight of the resultant polymer, a chain transfer agent such as hydrogen may be added.

The propylene used in the present invention can be produced in the presence of an isospecific Ziegler-Natta catalyst. The catalyst to be used is preferably one having high isospecificity.

It is preferred to use a catalyst whose transition metal catalyst component is a composite solid compound of a titanium trichloride or magnesium compound, which composite solid compound has a laminar crystalline structure and a titanium compound, and whose typical metal component is an organoaluminum compound. The catalyst may contain a known electron-donating compound as a third component.

The titanium trichloride is selected from those which are produced by reduction of titanium tetrachloride with a variety of reducing agents. As the reducing agent, there are known metals such as aluminum, titanium, etc., hydrogen, an organometal compound, and the like. A typical example of the titanium trichloride produced by metal reduction is a titanium trichloride composition containing activated aluminum chloride ($TiCl_3AA$), produced by reducing titanium tetrachloride with metal aluminum and then pulverizing the resultant mixture in an apparatus such as a ball mill or a vibration mill. In order to improve the isospecificity, polymerization activity and/or particulate properties of the catalyst, the above pulverization may be carried out in the presence of a compound selected from an ether, a ketone, an ester, aluminum chloride, titanium tetrachloride, etc.

Further preferred for the object of the present invention is titanium trichloride which is obtained by reducing titanium tetrachloride with an organoaluminum compound, and catalytically reacting the resultant titanium trichloride with an ether compound and with a halogen compound at the same time or consecutively. The preferred ether compound has the general formula of $R^1—O—R^2$ (in which each of $R^1$ and $R^2$ is an alkyl group having 1 to 18 carbon atoms), and particularly preferred are di-$n$-butyl ether and di-$t$-amyl ether. In particular, a preferred halogen is iodine, the preferred halogen compound is iodine trichloride, a preferred titanium halide is titanium tetrachloride, and a preferred halogenated hydrocarbon is selected from carbon tetrachloride and 1,2-dichloroethane. The preferred organoaluminum compound has the general formula of $AlR^3_nX_{3-n}$ (in which $R^3$ is a hydrocarbon group having 1 to 18 carbon atoms, X is an halogen selected from Cl, Br and I, and n is defined by $3 \geq n > 1$), and it is particularly preferably selected from diethylaluminum chloride and ethylaluminum sesquichloride.

The process for the production of the above titanium trichloride is specifically disclosed in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a laminar crystalline structure is used as a transition metal compound component, it is preferred to use, as a typical metal compound component, an organoaluminum compound having the general formula of $AlR^4_mX_{3-m}$ (in which $R^4$ is a hydrocarbon group having 1 to 18 carbon atoms, X is a halogen selected from Cl, Br and I, and m is defined by $3 \geq m > 0$). Particularly preferred for the object of the present invention is a compound of the above general formula in which $R^4$ is an ethyl or isobutyl group and m is defined by $2.5 \geq m > 1.5$. Specific examples thereof are diethylaluminum chloride, diethylaluminum bromide, diethylaluminum iodide, and mixtures of these with triethylaluminum or ethylaluminum dichloride. When a third compound to be discussed later is used in combination, also preferred for the object of the present invention is an organoaluminum compound of the above general formula in which m is defined by $3 \geq m > 2.5$ or $1.5 \geq m > 0$.

The molar ratio between the organoaluminum compound to titanium trichloride is between 1:1 and 1,000:1.

The catalyst comprising titanium trichloride and organoaluminum may contain a known third component. Examples of the third component are ester compounds such as $\epsilon$-caprolactam, methyl methacrylate, ethyl benzoate, methyl toluylate, etc.; phosphite esters such as triphenyl phosphite, tributyl phosphite, etc.; and phosphoric acid derivatives such as hexamethylphosphorictriamide, etc.; and the like.

The amount of the third component is to be experimentally determined for the individual compound, since the activity varies with the species of the compound. In general, the amount is not more than an amount equimolar to that of the organoaluminum.

When a composite solid compound of a magnesium compound and a titanium compound is used as the transition metal solid catalyst component, it is preferred to use as the typical metal catalyst component an organoaluminum compound and it is particularly preferred to use as such a compound having the general formula of $AlR^5_pX_{3-p}$ in which $R^5$ is a hydrocarbon group having 1 to 18 carbon atoms, X is a halogen selected from Cl, Br and I and p is defined by $3 \geq p > 2$. Specific examples thereof are triethylaluminum, triisobutylaluminum and mixtures of these with diethylaluminum chloride or diisobutylaluminum chloride.

The catalyst also preferably contains an electron-donating compound, particularly an aromatic monocarboxylic acid ester and/or a silicon compound containing an Si—$OR^6$ bond.

The preferred silicon compound containing an Si-$OR^6$ bond (in which $R^6$ is a hydrocarbon group having 1 to 20 carbon atoms) is an alkoxysilane compound having the general formula of $R^7_aSi(OR^6)_{4-a}$ each of $R^6$ and $R^7$ is hydrocarbon group having 1 to 20 carbon atoms and a is defined by $0 \leq a \leq 3$). Specific examples thereof are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The amount used of the above electron-donating compound per mole of the organoaluminum compound is preferably from not more than 1 mole, particularly preferably 0.05 to 1 mole.

The composite solid compound of a magnesium compound and a titanium compound is selected from titanium trichloride containing a chloride of magnesium obtained by reducing titanium tetrachloride with an organomagnesium compound, and the so-called "supported catalyst" prepared by catalytically reacting a solid magnesium compound with a liquid-phase titanium compound. The solid magnesium compound preferably contains an electron-donating compound, particularly an aromatic monocarboxylic acid ester, an aromatic dicarboxylic acid ester, an etherified compound, an alcohol and/or a phenolic compound. The aromatic monocarboxylic acid ester may be co-present when the solid magnesium compound is catalytically reacted with the titanium compound.

The above composite solid compound of the magnesium compound and the titanium compound is disclosed in many patent publications, and those suitable for the object of the present invention are specifically disclosed in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408 and JP-A-58-27704.

When the thermoplastic resin composition of the present invention is used in fields where heat resistance, stiffness, scratch resistance, etc. are required, it is desirable to use a highly crystalline polypropylene in which the homopolymer portion of the first segment polymerized in the first step of homopolymerizing or block-copolymerizing propylene has a boiling heptane-insoluble portion whose isotactic pentad is 0.970 or more, a boiling heptane-soluble portion whose content is not more than 5% by weight and a 20° C. xylene-soluble portion whose content is not more than 2.0% by weight.

The above isotactic pentad of the boiling heptane-insoluble portion, the content of the boiling heptane-soluble portion and the content of the 20° C. xylene-soluble portion are determined as follows.

5 Grams of a polypropylene was completely dissolved in 500 ml of boiling xylene, the resultant solution was cooled to 20° C., and the solution was allowed to stand for 4 hours. Then, the solution was filtered to separate a 20° C. xylene-insoluble portion. Xylene was evaporated by concentrating the filtrate and solidifying it by drying, and the residue was further dried under reduced pressure at 60° C. to obtain a polymer soluble in xylene at 20° C. The content of the 20° C. xylene-soluble portion was determined by dividing the dry weight of the polymer by the weight of the charged sample, and represented by percentage. The above 20° C. xylene-insoluble portion was dried, and then extracted with boiling n-heptane in a Soxhlet apparatus for 8 hours. The extraction residue is referred to as a boiling heptane-insoluble portion, and the content of the boiling heptane-insoluble portion was determined by subtracting the dry weight of the boiling heptane-insoluble portion from the weight (5 g) of the charged sample and dividing the remainder by the weight of the charged sample, and represented by percentage.

The isotactic pentad refers to a fraction of a propylene monomer unit present in the central position of an isotactic chain of a polypropylene molecule chain in a pentad unit or a chain formed of meso-bonded five successive propylene monomer units, determined by a method disclosed by A. Zambelli et al., in Macromolecules, 6, 925 (1973), i.e. a method using $^{13}$C-NMR. NMR absorption peaks are assigned on the basis of the subsequently issued Macromolecules, 8, 687 (1975).

Specifically, the isotactic pentad was determined on the basis of a relative ratio of the area of mmmm peaks to the total area of the absorption peaks assigned to methyl carbons. According to this method, the NPL standard substance CRM No. M19-14 Polypropylene PP/MWD/2 provided by the National Physical Laboratory in United Kingdom was measured for an isotactic pentad to show 0.944.

The above highly crystalline polypropylene can be prepared by any of the methods disclosed in JP-A-60-28405, JP-A-60-228504, JP-A-61-218606, JP-A-61-287917, etc.

When the thermoplastic resin composition of the present invention is used in fields where a high impact resistance is required, it is preferred to use a polypropylene containing a propylene homopolymer portion as the first segment polymerized in the first step and a propylene block copolymer as the second segment produced by copolymerization of ethylene with an α-olefin such as propylene, butene-1, etc.

The propylene block copolymer can be prepared by a slurry polymerization or gas phase polymerization method. In particular, when the thermoplastic resin composition is used in a field where a high impact resistance is necessary, it is required to increase the amount of the second segment, and the propylene block copolymer can be suitably prepared by a gas phase polymerization method.

Such a polypropylene having a high impact resistance can be prepared by a gas phase polymerization method disclosed, e.g. in JP-A-61-287917.

In the propylene block copolymer, the propylene homopolymer portion polymerized in the first step may be any of a propylene homopolymer or a copolymer of propylene with ethylene or an α-olefin having 4 to 6 carbon atoms wherein the content of the ethylene or α-olefin units is not more than 6 mole %. The copolymer portion as the second segment polymerized in the second step is preferably a homopolymer of ethylene or a copolymer of ethylene with propylene and optionally an α-olefin having 4 to 6 carbon atoms wherein the ethylene content is not less than 10 mole %. The amount of the polymer formed in the second step is 10 to 70% by weight based on the propylene block copolymer.

A slurry polymerization method gives a propylene block copolymer having a second segment content of 10 to 30% by weight, and a gas phase polymerization method gives a propylene block copolymer having a second segment content of 10 to 70% by weight.

In the gas phase polymerization method, a propylene block copolymer having a larger content of the second segment can be prepared by a process disclosed in JP-A-1-98604, and such a copolymer can be suitably used in a field where an ultrahigh impact resistance is required.

The intrinsic viscosity of the second segment in tetralin at 135° C. should be changed depending upon production efficiency, the physical properties of the product powder and an intrinsic viscosity of the first segment. In general, however, it is 3-8 dl/g for a slurry polymerization method and 1 to 5 dl/g for a gas phase polymerization method.

In the present invention, the modified polypropylene (A) or (B) can be obtained by graft-polymerizing an unsaturated carboxylic acid or a derivative thereof, or a mixture of an unsaturated carboxylic acid or a derivative thereof with an unsaturated aromatic monomer onto a polypropylene, if necessary, in the presence of a radical initiator.

When the above monomers are grafted on a polypropylene, various conventional methods can be employed.

For example, a graft polypropylene can be obtained by a method which comprises mixing polypropylene, a graft monomer and a radical-generating agent and melt-kneading the resultant mixture in a melt-kneading apparatus, or by a method which comprises dissolving polypropylene in an organic solvent such as xylene, adding a radical-generating agent under nitrogen atmosphere, carrying out a reaction of the resultant mixture by heating it with stirring, cooling the reaction mixture after the reaction, washing the reaction product, filtering it and drying it. Besides the above methods, there can be employed a method which comprises irradiating a polypropylene with ultraviolet light in the presence of a graft monomer or a method which comprises bringing a polypropylene into contact with oxygen or ozone in the presence of a graft monomer.

In view of the economical benefit, etc., the most preferred method is the graft polymerization method which comprises melt-kneading a polypropylene and a graft monomer in a melt-kneading apparatus.

The melt-kneading of a polypropylene and an unsaturated carboxylic acid or a derivative thereof, or a polypropylene and a mixture of an unsaturated carboxylic acid or a derivative thereof with an unsaturated aromatic monomer, if necessary, in the presence of a radical initiator can be carried out with an extruder, a Banbury mixer, a kneader, etc. at a temperature of 150° to 300° C., preferably 190° to 280° C. for a residence time of 0.3 to 10 minutes, preferably 0.5 to 5 minutes. It is industrially advantageous to continuously produce a modified polypropylene with a single- or twin-screw extruder while keeping the vent holes in a vacuous state and removing unreacted components (unsaturated carboxylic acid or a derivative thereof, unsaturated aromatic monomer, radical initiator, etc.) and by-products such as oligomers and decomposition products of these components. The reaction may be carried out in air, but is preferably carried out in an inert gas such as nitrogen or carbon dioxide. In addition, in order to further remove trace amounts of unreacted components and by-products contained in the modified polypropylene, the modified polypropylene may be heat-treated at a temperature of 60° C. or higher, extracted with a solvent and vacuum-drawn while melted.

A variety of additives may be optionally added to the modified polypropylene (A) or (B) during the modification or post-treatment. Examples of such additives are an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, etc.

Examples of the unsaturated carboxylic acid or the derivative thereof used for the polypropylene modification are unsaturated carboxylic acids such as acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo[2,2,1]octa-7-ene-2,3,5,6-tetracarboxylic acid, 7-oxabicyclo[2,2,1]hepta-5-ene-2,3-dicarboxylic acid, etc.; and acid anhydrides, esters, amides, imides and metal salts of the unsaturated carboxylic acids such as maleic anhydride, itaconic anhydride, citraconic anhydride, bicyclo[2,2,1]hepta-5-ene-2,3-dicarboxylic acid anhydride (himic anhydride), monoethyl maleate, monomethyl fumarate, monomethyl itaconate, dimethylaminoethyl methacrylate, dimethylaminopropylacrylamide, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid-monoamide, fumaric acid-diamide, fumaric acid-N-monoethylamide, fumaric acid-N,N-dimethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, potassium methacrylate, etc.

Of these, maleic anhydride is most preferred.

The most preferred unsaturated aromatic monomer is styrene. Other examples of the unsaturated aromatic monomer are o-methylstyrene, p-methylstyrene, m-methylstyrene, α-methylstyrene, vinyltoluene and vinylbenzene. These compounds may also be used in combination.

The polypropylene modification can be carried out in the absence of a radical initiator. In general, however, it is carried out preferably in the presence of a radical initiator. Known radical initiators are usable as such. Examples of the radical initiator are azo compounds such as 2,2'-azobisisobutyronitrile, 2,2'-azobis[2,4,4]-trimethylvaleronitrile, etc.; and various organic peroxides such as methyl ethyl ketone peroxide, cyclohexane peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihdyroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanol peroxide, benzoyl peroxide, t-butyl peracetate, t-butylproxyisobutyrate, t-butyloxypivarate, t-butyloxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropylcarbonate, polystyrene peroxide, etc.

In the modification, the melt flow rate of the polypropylenes as a starting material (crystalline propylene homopolymer, crystalline propylene-ethylene/α-olefin block copolymer or crystalline propylene-ethylene/α-olefin random copolymer) is not critical. In general, however, it is 0.05 to 60 g/10 minutes, preferably 0.1 to 40 g/10 minutes. Further, it is desirable to select polypropylenes as a starting material so that the melt flow rate of the resultant modified polypropylene (A) or (B) is 0.1 to 100 g/10 minutes, preferably 0.5 to 70 g/10 minutes. The polypropylenes as a starting material have a number average molecular weight of 7,000 to 800,000, preferably 10,000 to 700,000.

For the modification, the amounts of each component per 100 parts by weight of the polypropylene are as follows. The amount of the unsaturated carboxylic acid or the derivative thereof is preferably 0.01 to 10 parts by weight, more preferably 0.01 to 5 parts by weight; that of the radical initiator is preferably 0 to 5 parts by weight, more preferably 0.001 to 2 parts by weight. When the amount of the unsaturated carboxylic acid or a derivative thereof is less than 0.01 parts by weight, there is no remarkable effect on the modification. When it exceeds 10 parts by weight, the effect on the modification arrives at its limit, and no further effect is exhibited. Moreover, the use of such an excess amount is practically undesirable, since a large amount of the unsaturated carboxylic acid or a derivative thereof remains unreacted in the resultant polymer, which causes offensive smell and a degradation in the physical properties of the thermoplastic resin composition. The use of the radical initiator in an amount of more than 5% by weight is practically undesirable, since it gives no further remarkable effect on the graft reaction of the unsaturated carboxylic acid or the derivative thereof and since the polypropylene is decomposed to a great extent to change the fluidity (melt flow rate) greatly.

In the present invention, the modified polypropylene resin composition (D) has a melt flow rate, preferably, of 0.1 to 100 g/10 minutes, particularly preferably, of 0.4 to 40 g/10 minutes.

In the present invention, the epoxy group-containing copolymer (E) is a copolymer composed of an unsaturated epoxy compound and an ethylenically unsaturated compound.

The composition ratio of the epoxy group-containing copolymer (E) is not critical. In general, however, the proportion of the unsaturated epoxy compound is 0.1 to 50% by weight, preferably 1 to 30% by weight.

The unsaturated epoxy compound is a compound containing an unsaturated group copolymerizable with the ethylenically unsaturated compound and an epoxy group in the molecule.

Examples of the unsaturated epoxy compound are unsaturated glycidyl esters and unsaturated glycidyl ethers which are represented by the following general formulae (1) and (2), respectively.

(1)

wherein R is a C$_{2-18}$ hydrocarbon group having an ethylenically unsaturated bond.

(2)

wherein R is a C$_{2-18}$ hydrocarbon group having an ethylenically unsaturated bond, and X is —CH$_2$—O— or Specific examples of the unsaturated epoxy compound are glycidyl acrylate, glycidyl methacrylate, glycidyl itaconates, allylglycidyl ether, 2-methylglycidyl ether, and styrene-p-glycidyl ether.

Examples of the ethylenically unsaturated compound are olefins, vinyl esters of saturated carboxylic acid having 2 to 6 carbon atoms, esters of saturated alcohols having 1 to 8 carbon atoms with acrylic or methacrylic acid, maleic acid esters, methacrylic esters and fumaric esters of the alcohols, halogenated vinyls, styrenes, nitriles, vinyl ethers, acrylamides, etc.

Specific examples of the ethylenically unsaturated compound are ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutylvinyl ether, acrylamide, etc. Of these, ethylene is particularly preferred.

In order to improve the impact resistance at low temperatures by decreasing a glass transition temperature, it is preferable to copolymerize vinyl acetate and/or methyl acrylate as a third component in addition to ethylene as a second component.

The amount of the third component is not critical. In general, it is not more than 20% by weight, preferably 5 to 15% by weight.

The epoxy group-containing copolymer can be prepared by various methods. It is possible to employ both a random copolymerization method in which the unsaturated epoxy compound is introduced into the main chain of the copolymer and a random copolymerization method in which the unsaturated epoxy compound is introduced as a branch for the copolymer. The preparation method can be specifically selected from a method which comprises copolymerizing the unsaturated epoxy compound and ethylene in the presence of a radical-generating agent at 500 to 4,000 atmospheres at 100° to 300° C. in the presence or absence of a suitable solvent and chain transfer agent, a method which comprises mixing a polypropylene with the unsaturated epoxy compound and a radical-generating agent and subjecting the resultant mixture to melt graft copolymerization in an extruder and a method which comprises copolymerizing the unsaturated epoxy compound and the ethylenically unsaturated compound in an inert medium such as water or an organic solvent in the presence of a radical-generating agent.

In order to promote a reaction of unsaturated carboxylic acid or a derivative thereof, which is grafted on the modified polypropylene (A) or (B) or the modified polypropylene resin composition (A') or (B') containing the modified rubbery substance (F), with the epoxy group-containing copolymer (E), a basic compound (H) may be co-present when the thermoplastic resin composition of the present invention is produced.

Due to the co-presence of a basic compound, the reaction time and the production time can be shortened. The basic compound can be suitably selected, for example, from organic amine compounds such as benzyldimethylamine, 2,4,6-tris(dimethylaminoethyl)phenol, etc.

The above basic compound may be mixed with the components for the thermoplastic resin composition, or may be preliminary mixed with a part of the resin components or with a resin compatible with the thermoplastic resin composition so as to prepare a master batch of high concentration.

The rubbery substance (F) used to improve the impact resistance, low-temperature impact resistance in particular, can be selected from ethylene-based copolymer rubber, propylene-butene rubber, isoprene-butylene rubber, polyisoprene, polybutadiene, styrene-based block copolymers such as styrene-butadiene rubber, a styrene-butadiene-styrene block copolymer, a partially hydrogenated styrene-butadiene block copolymer, styrene-isoprene block copolymer, a partially hydrogenated styrene-isoprene block copolymer, etc., linear low-density polyethylene, and mixtures of these.

Examples of the ethylene-based copolymer rubber are ethylene-α-olefin copolymer rubbers or ethylene-α-olefin-nonconjugated diene copolymer rubbers, of which the typical example is ethylene-propylene copolymer rubber (to be abbreviated as "EPM" hereinafter) and ethylene-propylene-nonconjugated diene copolymer rubber (to be referred to as "EPDM" hereinafter), an ethylene-vinyl acetate copolymer, an ethylene-methyl acrylate copolymer, an ethylene-methyl methacrylate copolymer, an ethylene-ethyl acrylate copolymer, an ethylene-ethyl methacrylate copolymer, an ethylene-butyl acrylate copolymer, an ethylene-butyl methacrylate copolymer, an ethylene-acrylic acid or its partial metal salt copolymer, an ethylene-methacrylic acid or its partial metal salt copolymer, an ethylene-acrylic acid-acrylic ester copolymer, an ethylene-acrylic acid-methacrylic ester copolymer, an ethylene-methacrylic acid-acrylic ester copolymer, an ethylene-methacrylic acid-methacrylic ester copolymer, an ethylene-vinyl alcohol copolymer, an ethylene-vinyl acetate-vinyl alcohol copolymer, an ethylene-styrene copolymer, etc. These ethylene-based copolymer rubbers can also be used in combination. Further, the ethylene-based copolymer rubber can be used by mixing it with a low-density or high-density polyethylene which is well compatible with it. A modified rubbery substance (G) is obtained by graft-polymerizing the unsaturated carboxylic acid or a derivative thereof, or the unsaturated carboxylic acid or a derivative thereof and the unsaturated aromatic monomer, onto the above rubbery substance (F), if necessary, in the co-presence of a radical initiator or by introducing the unsaturated carboxylic acid or a derivative thereof, or a mixture of the unsaturated carboxylic acid or a derivative thereof with the unsaturated aromatic monomer, into the α-olefin main chain.

The starting rubbery material for the rubbery substance (F) and the modified rubbery substance (G) can be particularly suitably selected from ethylene-based copolymers and styrene-based block copolymers.

Of the ethylene copolymer rubbers, particularly preferred are ethylene-α-olefin copolymer rubber and ethylene-α-olefin nonconjugated copolymer rubber. Examples of the ethylene-α-olefin copolymer rubber include a copolymer of ethylene with another α-olefin such as propylene, 1-butene, 1-pentene, 1-hexene, 4-methyl-1-pentene, 1-octene, or the like and terpolymer rubbers such as an ethylene-propylene-1-butene copolymer. Of these, ethylene-propylene copolymer rubber and ethylene-1-butene copolymer rubber are preferred.

Further, ethylene-α-olefin-nonconjugated diene copolymer rubber can be also used. However, it is preferable to adjust the nonconjugated diene content in the starting material rubber to not more than 3% by weight. When the nonconjugated diene content exceeds 3% by weight, the composition undesirably undergoes gelation when it is kneaded.

The ethylene content in the ethylene-α-olefin copolymer rubber is 15 to 85% by weight, preferably 40 to 80% by weight. That is, a highly crystalline polymer having an ethylene content of more than 85% by weight is difficult to process under ordinary rubber-forming conditions, and that having an ethylene content of less than 15% by weight shows an increase in glass transition temperature (Tg), and undesirably a loss of rubber properties.

The ethylene-α-olefin copolymer rubber preferably has a number average molecular weight of 10,000 to 100,000, with which it can be kneaded in an extruder. When the molecular weight thereof is too low, the ethylene-α-olefin copolymer rubber is difficult to handle when fed into an extruder, and when it is too high, the ethylene-α-olefin copolymer rubber shows a low fluidity and causes difficulty in processing.

The molecular weight distribution of the ethylene-α-olefin copolymer rubber is not critical. In general, there can be used any of the generally manufactured and commercially available copolymer rubbers having a variety of molecular weight distributions such as a monomodal distribution and a bimodal distribution.

The Q value (weight average molecular weight/number average molecular weight) of the molecular weight distribution is preferably in the range of 1 to 30, more preferably 2 to 20.

Said copolymer rubber is produced in the presence of a Ziegler-Natta catalyst which is a general production catalyst. For example, a combination of an organoaluminum compound with a trivalent to pentavalent vanadium compound soluble in a hydrocarbon solvent is used as a Ziegler-Natta catalyst. The aluminum compound can be selected from alkylaluminum sesquichloride, trialkylaluminum, dialkylaluminum monochloride, and mixtures of these. The vanadium compound can be selected from vanadium oxytrichloride, vanadium tetrachloride and a vanadate compound of the formula VO-$(OR^8)_q X_{3-q}$ ($0 < q \leq 3$, $R^8$ is a linear, branched or cyclic hydrocarbon having 1 to 10 carbon atoms, and X is a halogen selected from Cl, Br and I).

Of the styrene-based block copolymers, particularly preferred is a partially halogenated styrene-butadiene block copolymer. The partially hydrogenated styrene-butadiene block copolymer is produced by partial hydrogenation of a styrene-butadiene block copolymer. The structure and production process thereof are described below.

In the partially hydrogenated styrene-butadiene block copolymer, the number average molecular weight of the block copolymer rubber is 10,000 to 1,000,000, preferably 20,000 to 300,000, the number average molecular weight of the unsaturated aromatic polymer block in the block copolymer rubber is 1,000 to 200,000, preferably 2,000 to 100,000, the number average molecular weight of the conjugated diene polymer block is 1,000 to 200,000, preferably 2,000 to 100,000, and the weight ratio of the unsaturated aromatic polymer block to the conjugated diene polymer block is 2/98 to 60/40, preferably 10/90 to 40/60.

Many processes have been proposed for the production of the block copolymer rubber. A typical process is disclosed in Japanese Patent Publication Kokoku No. 40-23798, in which a block copolymer rubber of an unsaturated aromatic hydrocarbon and a diene hydrocarbon can be produced by block copolymerization in an inert solvent in the presence of a lithium catalyst or a Ziegler-Natta catalyst.

Such a block copolymer rubber is hydrogenated in an inert solvent in the presence of a hydrogenation catalyst, e.g. according to any of the methods disclosed in Japanese Patent Publications Kokoku Nos. 42-8704, 43-6636 and 46-20814. The hydrogenation is carried out such that the hydrogenation ratio of the conjugated diene polymer block is at least 50%, preferably 80% or more and the hydrogenation ratio of the aromatic unsaturated bond in the unsaturated aromatic polymer is not more than 25%. One typical example of such a partially completely hydrogenated block copolymer is on the market under the trade name of KRATON®-G, supplied by Shell Chemical Co., U.S.A.

In the production of the modified rubbery substance (G), the method for graft-copolymerizing a graft monomer on the rubbery substance can be selected from a variety of known methods.

For example, the graft copolymerization is carried out by a method which comprises mixing a rubbery substance, a graft monomer and a radical initiator and melt-kneading the mixture in a melt-kneading apparatus, or a method which comprises dissolving an ethylene-based copolymer rubber in an organic solvent such as xylene, adding to the resulting solution a radical initiator under nitrogen atmosphere, allowing the mixture to react under heat with stirring, cooling the reaction mixture after the reaction, washing the reaction product, filtering it and drying it to obtain a grafted ethylene-based copolymer rubber. In addition to these, there are a method which comprises irradiating an ethylene-based copolymer rubber with ultraviolet light or radiation in the presence of a graft monomer, and a method which comprises bringing a rubbery substance into contact with oxygen or ozone.

In view of the economical benefit, it is most preferred to employ a graft copolymerization method in which the above materials are melt-kneaded in a melt-kneading apparatus.

In the present invention, the modified rubbery substance (G) can be obtained by melt-kneading the starting rubbery substance with an unsaturated carboxylic acid or a derivative thereof, if necessary, in the co-presence of a radical initiator, or the starting rubbery substance with an unsaturated carboxylic acid or an derivative thereof and an unsaturated aromatic monomer, if necessary, in the co-presence of a radical initiator, with an extruder, Banbury mixer, kneader, or the like, at a temperature of 200° to 280° C., preferably 230° to 260° C. for a residence time of 0.2 to 10 minutes, which varies depending upon the radical initiator.

The presence of too large an amount of oxygen during the kneading sometimes results in the formation of a gel or in serious coloring. Therefore, the kneading is carried out desirably in the substantial absence of oxygen.

When the kneading temperature is lower than 200° C., unsaturated carboxylic acid anhydride is not grafted in such an amount as desired, and only a small effect is produced in improving the degree of the graft reaction. When the kneading temperature is higher than 280° C., the effect in improving the degree of the graft reaction is small, and in some cases, formation of a gel, coloring, etc., are liable to occur.

The kneading machine is not critical. In general, an extruder is preferred since it permits continuous production, and the extruder preferably has a single screw or twin screws suitable for homogeneously kneading the starting materials.

In order to remove unreacted components (unsaturated carboxylic acid or a derivative thereof, unsaturated aromatic monomer, radical initiator, etc.) and by-products such as oligomers and decomposition products thereof from the reaction product, the reaction product can be purified by effecting vacuum pump-suction through vent lines halfway along the extruder or in a place near its outlet, or by dissolving the reaction product in a suitable solvent to precipitate it. The reaction product can also be subjected to heat treatment at a temperature of not less than 60° C. and vacuuming with melting.

The above three or four components may be separately fed to a kneading machine, or alternatively, some or all of these components may be uniformly mixed in advance of feeding them. For example, it is possible to employ a kneading method which comprises feeding a rubber preliminarily impregnated with both a radical initiator and an unsaturated aromatic monomer and the unsaturated carboxylic acid or the derivative thereof at the same time and kneading the resultant mixture. It is also possible to employ a modification method which comprises a radical initiator and/or an unsaturated carboxylic acid or a derivative thereof and an unsaturated aromatic monomer halfway along an extruder.

A variety of additives may be optionally added to the modified rubbery substance (G) during the modification or post-treatment. Examples of such additives are an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, etc.

The unsaturated carboxylic acid or the derivative thereof and the radical initiator to obtain the modified rubbery substance (G) can be selected from those compounds used for the production of the modified polypropylene (A), etc. As an unsaturated aromatic monomer, styrene is most preferred. The unsaturated aromatic monomer can be also selected from o-methylstyrene, p-methylstyrene, α-methylstyrene, vinyltoluene, divinylbenzene and admixtures thereof.

In the production of said modified rubbery substance (G), the unsaturated aromatic monomer is used to prevent gel formation and improve the graft reaction degree. Per 100 parts by weight of the starting rubbery substance, the amount of the unsaturated aromatic monomer is preferably 0.2 to 20 parts by weight, and the amount of the unsaturated carboxylic acid or a derivative thereof is preferably 0.5 to 15 parts by weight. When the unsaturated aromatic monomer is also used, the amount of the unsaturated carboxylic acid or a derivative thereof is preferably 0.5 to 15 parts by weight, and the weight ratio of unsaturated aromatic monomer to unsaturated carboxylic acid or a derivative thereof is preferably 0.1 to 3.0, more preferably 0.5 to 2.0.

When the weight ratio of the unsaturated aromatic monomer to the unsaturated carboxylic acid or a derivative thereof is less than 0.1, no effect is observed on the prevention of gel formation and the improvement in degree of the graft reaction. When the above weight ratio exceeds 3.0, no further effect can be expected.

The amount of the radical initiator used depends on its kind and the kneading conditions. In general, it can be used in an amount of 0.005 to 1.0 part by weight, preferably 0.01 to 0.5 part by weight per 100 parts by weight of the rubber as a material. When the amount of the radical initiator is less than 0.005 part by weight, the unsaturated carboxylic acid or a derivative thereof is not grafted in an amount as desired, and an effect of the combined use of the unsaturated aromatic monomer on an increase in an amount of the grafted unsaturated carboxylic acid or a derivative thereof is small. When the above amount exceeds 1.0 part by weight, gel formation is, undesirably, liable to occur.

The modified rubbery substance (G) obtained above preferably contains 0.1 to 5% by weight of the grafted unsaturated carboxylic acid or a derivative thereof and 0.1 to 5% by weight of the grafted unsaturated aromatic monomer and has a Mooney viscosity ($ML_{1+4}121°$ C.) of 5 to 120.

The modified rubbery substance (G) is also produced by another method in which the unsaturated carboxylic acid or a derivative thereof is introduced into the main chain of the starting rubber material by copolymerization in the presence of a polymerization initiator and a catalyst. In general, the modified rubbery substance can be produced by the following known high-pressure radical copolymerization method. That is, it can be produced by copolymerizing ethylene with a radical-polymerizable monomer (comonomer) in the presence of a free radical-generating agent such as organic peroxide, oxygen, etc. The copolymerization is generally carried out at a polymerization temperature of 130° to 300° C. under a polymerization pressure of 500 to 3,000 $kg/cm^2$.

The radical-copolymerizable monomer can be selected from unsaturated carboxylic acids or esterification products thereof such as acrylic acid, methacrylic acid, etc., vinyl esters such as vinyl acetate, etc., and the like. Specific examples of the esterification products of unsaturated carboxylic acids are methyl acrylate, ethyl acrylate, methyl methacrylate, glycidyl methacrylate, etc. These comonomers can be used alone or in combination.

The comonomer content in the modified rubbery substance (G) directly copolymerized is 0.1 to 40% by weight, preferably 1 to 35% by weight. When the comonomer content is less than 0.1% by weight, no effect is produced on the modification.

These copolymers exclude those specified as examples of the rubbery substance (F) and the rubber substance as a material for the modified rubbery substance (G). Of these, an ethylene-acrylic acid copolymer and an ethylene-methacrylic acid copolymer are preferred.

Each of the modified polypropylene resin compositions (A') and (B') is produced by co-modifying a polypropylene with a rubbery substance as a material by adding an unsaturated carboxylic acid or a derivative thereof or a mixture of an unsaturated carboxylic acid or a derivative thereof with an unsaturated aromatic monomer.

That is, the modified polypropylene resin compositions (A') and (B') are produced according to a similar method to those described concerning the production of the modified polypropylenes (A) and (B) and the modified rubbery substance (G), i.e. the polypropylene and the rubbery substance as a material can be co-modified by grafting an unsaturated carboxylic acid or a derivative thereof or a mixture of an unsaturated carboxylic acid or a derivative thereof with an unsaturated aromatic monomer on the polypropylene and the rubber substance, which are allowed to be co-present, optionally in the presence of a radical initiator.

The polypropylene and an ethylene-based copolymer rubber as starting materials are allowed to be co-present according to various known methods as follows. When these two starting materials are pellets, powders or pulverized products, these materials are fed into an extruder separately or through the same feeding port to allow them to be co-present in the device, or these materials are preliminarily uniformly mixed by means for a simple mixing device such as a tumbler, Henschel mixer, etc. When either of these materials is a large solid, it is preliminarily melt-kneaded and homogenized with a batch melt-kneading apparatus such as a roll, a kneader, a Banbury mixer, etc., and pelletized for a pulverized so that it can be easily fed to a co-modifying apparatus.

Steps other than the step of allowing the polypropylene and the rubbery substance as materials to be co-present can be carried out in the same manner as that used for the production of the modified polypropylene (A) and (B) or that used for the production of the modified rubbery substance (G), whereby the above materials are co-modified.

In said co-modification, the proportions of the polypropylene and the rubbery substance as materials can be freely selected. However, it is preferable to determine the proportions on the basis of the proportions of the modified polypropylenes (A) and (B) and the modified rubbery substance (G) in the thermoplastic resin composition of the present invention.

When the co-modification is carried out, per 100 parts by weight of the polypropylene and the rubber substance in total, the amount of the unsaturated carboxylic acid or a derivative thereof is preferably 0.01 to 20 parts by weight, more particularly 0.1 to 5 parts by weight, and the amount of the radical initiator, if necessary, is preferably 0 to 5 parts by weight, more preferably 0.001 to 2 parts by weight.

In order to disperse the polypropylene and the rubbery substance as materials while dynamically co-modifying them, it is preferable to use a highly efficient melt-kneading apparatus such as a highly efficient twin-screw extruder, etc.

The amount of the unsaturated carboxylic acid or a derivative thereof, which is grafted, is not critical. In general, it is 0.01 to 0.50% by weight, preferably 0.20 to 0.45% by weight. As the unsaturated carboxylic acid or a derivative thereof, maleic anhydride is preferred. The melt flow rate of each of the modified polypropylene compositions (A') and (B') is not critical. In general, it is 0.1 to 100 g/minute, preferably 5 to 50 g/10 minutes. The amount of the unsaturated aromatic monomer grafted in the modified polypropylene composition (B') is not critical. In general, it is less than 0.5% by weight, preferably 0.1 to 0.3% by weight. As an unsaturated aromatic monomer, styrene is preferred.

It is one of preferred embodiments to use the thermoplastic resin composition of the present invention as a composite material by further incorporating thereinto a flame-retardant or flame retardant auxiliary, a lubricant, a nucleating agent, a plasticizer, a dye, a pigment, an antistatic agent, an antioxidant, a weathering resistance-imparting agent, etc.

The thermoplastic resin composition of the present invention contains 1 to 99% by weight, preferably 5 to 95% by weight of the modified polypropylene resin composition (D) as a first component. When the above content is less than 1% by weight, the resultant thermoplastic resin composition is not sufficient in moldability, toughness, water resistance, chemical resistance, etc.

When the modified polypropylene resin or resin composition (D) is selected from either the modified polypropylene (A) or (B) or the modified polypropylene composition (A') or (B') and polypropylene (C), the content of the modified polypropylene (A) or (B) or the modified polypropylene composition (A') or (B') in this resin or resin composition (D) may be not less than 5% by weight. When said content is less than 5% by weight, the final resin composition has a problem in compatibility and dispersibility. Further, no sufficient toughness and impact resistance can be obtained, nor are the coatability, adhesiveness and printability sufficient.

The amount of the epoxy group-containing copolymer (E) per 100 parts by weight of the modified polypropylene resin composition is 0.1 to 300 parts by weight, preferably 0.5 to 200 parts by weight. When this amount is less than 0.1 part by weight, the resultant resin composition is poor in compatibility and dispersibility, and it exhibits insufficient toughness and impact resistance and poor extrusion stability. The thermoplastic resin composition containing more than 100 parts by weight of the epoxy group-containing copolymer (E) is useful as an elastomer. However, when the above amount exceeds 300 parts by weight, the resultant resin composition shows great degradation is toughness, heat resistance, etc., and no desirable result can be obtained.

The amount of the rubbery substance (F) and/or the modified rubbery substance (G) optionally used to improve the low-temperature impact resistance is 0.1 to 300 parts by weight, preferably 1 to 200 parts by weight, per 100 parts by weight of the modified polypropylene resin or resin composition (D). When this amount is less than 0.1 part by weight, no effect is produced on the impact resistance. The thermoplastic resin composition containing more than 100 parts by weight of the rubbery substance (F) and/or the modified rubbery substance (G) is useful as an elastomer. However, when the above amount exceeds 300 parts by weight, the resultant resin composition sometimes shows great degradation in toughness, heat resistance, etc., and no desirable result can be obtained.

The amount of the basic compound (H) optionally incorporated as a reaction promoter is usually not more than 5 parts by weight, preferably 0.01 to 2 parts by weight per 100 parts by weight of the resin composition comprising the modified polypropylene resin or resin composition (D) and the epoxy group-containing copolymer (E). When the kneading strength at a kneading time is sufficient and when the residence time within a kneader is sufficient to the reaction, it is not necessary to incorporate the basic compound (H). When more than 5 parts by weight of the basic compound (H) are incorporated, a serious problem in the appearance of the resultant molded article and an offensive odor occur due to bleeding, and no desirable effect can be obtained, although there is an effect on the reaction promotion.

The process for the production of the thermoplastic resin composition of the present invention is not critical, and can be generally selected from conventional processes.

It may be effective to employ a process which comprises mixing the starting materials in a solution state and evaporating a solvent or precipitating the resin composition in a non-solvent. From an industrial viewpoint, it is preferred to employ a process which comprises kneading the starting materials in a molten state. The melt-kneading can be carried out by means of a variety of kneading apparatus such as a Banbury mixer, an extruder, a roll, a kneader, etc.

For the melt-kneading, it is preferable to preliminarily mix the resin components all in a powder or pellet form uniformly with an apparatus such as a tumbler or a Henschel mixer. If necessary, it is possible to individually feed predetermined amounts of the resin components to a kneading apparatus without the preliminary mixing.

When a powder or a master batch of the basic compound (H) is used for reaction promotion, both of the above methods can be used. When the basic compound (H) is a liquid, it is preferred to preliminarily mix the basic compound with the resin components by means of a tumbler or a Henschel mixer. Further, it is also possible to employ a method in which a kneading apparatus is provided with a quantitative pump and a liquid is added through a tube.

The kneaded resin composition is molded by various molding methods such as injection molding, extrusion molding, etc. The scope of the present invention also includes a method in which a molded article is produced by dry-blending the starting materials during injection molding or extrusion molding without carrying out the preliminary mixing step, and kneading the resultant composition during melt processing.

In the present invention, the kneading order is not critical. Some of the specific examples are shown below:

(1) The modified polypropylene (A) or the modified polypropylene composition (A'), the polypropylene (C), the epoxy group-containing copolymer (E), the rubbery substance (F) and/or the modified rubbery substance (G), and optionally, the basic compound (H) are kneaded in one lot.

(2) The modified polypropylene resin or resin composition (D) is preliminary prepared by kneading the modified polypropylene (A) and the polypropylene (C) or the modified polypropylene composition (A') and the polypropylene (C). Thereafter, the epoxy group-containing copolymer (E), the rubber substance (F) and/or the modified rubber substance (G) and optionally the basic compound (H) are added, and the resultant mixture is kneaded.

(3) The modified polypropylene resin or resin composition (D) and the rubber substance (F) and/or the modified rubbery substance (G) are preliminarily kneaded. Thereafter, the epoxy group-containing copolymer (E) and optionally, the basic compound (H) are added, and the resultant mixture is kneaded.

Besides the above orders, other orders may be possible. However, when the modified polypropylene (A) or the modified polypropylene composition (A') and the epoxy group-containing copolymer (E) are preliminarily kneaded, or when the epoxy group-containing copolymer (E) and the modified rubbery substance (G) are preliminary kneaded, a gel is sometimes formed depending upon the proportions of these two components employed. In such a case, it is necessary to select suitable proportions of the two components properly before kneading them.

In order to simplify the kneading step, the step for the preliminary production of the modified polypropylene (A) or (B) or the modified polypropylene composition (A') or (B') may be integrated into the step for kneading the thermoplastic resin composition of the present invention.

That is, the thermoplastic resin composition of the present invention may be produced by modifying a polypropylene as a starting material or co-modifying a polypropylene and a rubbery substance as starting materials in the first step, and charging the polypropylene (C), the epoxy group-containing copolymer (E) and optionally, the basic compound (H) to a site where the modified material or the co-modified materials are in a molten state in the second step.

In order to produce the thermoplastic resin composition of the present invention, it is preferred to use a highly efficient twin-screw extruder having a high L/D ratio and two or more feeding ports. That is, the material for the modification or the materials for the co-modification are charged through a first feeding port, and modified or co-modified sufficiently until components other than the modified polypropylene (A) or (B) or the modified polypropylene composition (A') or (B') are charged through a next feeding port, and then, the other compositions are charged through a second feeding port to knead the resultant mixture, whereby the thermoplastic resin composition can be efficiently produced.

In order to allow the basic compound (H) to exhibit a reaction promotion effect efficiently, it is possible to employ a method in which a high concentration of the basic compound (H) may be dispersed in one components which constitutes the thermoplastic resin composition of the present invention or a resin which is compatible with the thermoplastic resin composition, and the resultant master batch is incorporated into the other components and kneaded therewith. This method and other kneading methods may be employed in order to obtain desirable physical properties of the thermoplastic resin composition of the present invention.

The thermoplastic resin composition of the present invention can be molded by a general molding or forming method such as injection molding, extrusion molding, compression molding, blow molding, roll molding, lamination molding, vacuum forming, pressure molding, etc. The present invention also includes, it its scope, a method in which the components are dry-blended during injection molding or extrusion molding without a step of preliminary kneading, and the resultant dry blend is kneaded during melt-processing.

Of the above molding and forming methods, injection molding is preferred from the viewpoint of productivity, etc. A molded article is obtained by preliminarily drying a pelletized composition in a vacuum dryer, a hot air dryer, etc., and injection-molding the composition under predetermined conditions including injection rate, injection time, cooling temperature, etc.

Molded articles produced from the thermoplastic resin composition of the present invention are used as automobile parts, electric and electronic parts, etc. Examples of the automobile parts are exterior fittings such as a bumper, a fender, an apron, a hood pane, a facia, a locker panel, a locker panel reinforce, a floor panel, a rear quarter panel, a door panel, a door support, a roof top, a trunk lid, etc.; interior fittings such as a instrumental panel, a console box, a glove box, a shift knob, a pillar garnish, a door trim, a steering wheel, an arm rest, a window roover, a carpet, a head rest, a seat belt, a seat, etc., internal fittings in an engine room such as a distributor cap, an air cleaner, a radiator tank, a battery case, a radiator shroud, a washer tank, a cooling fan, a heater case, etc.; a mirror body, a wheel cover, a trunk trim, a trunk mat, a gasoline tank, and the like.

Of the above molded articles used as automobile parts, the thermoplastic resin composition of the present invention is particularly suitably usable for a bumper and a fender, of which excellent stiffness and low-temperature impact resistance are required.

The present invention will be explained hereinafter by reference to the Examples, to which the present invention shall not be limited.

Methods for measuring the physical properties in Examples are described below.

(1) Melt flow rate

Measured according to the method specified in JIS K6758. The measurement temperature was 230° C., and the load was 2.16 kg unless otherwise specified.

(2) Tensile test

Carried out according to the method specified in ASTM D638. A test piece having a thickness of 3.2 mm was measured for a tensile yield strength and a tensile elongation. The measurement temperature was 23° C. unless otherwise specified.

(3) Flexural test

Carried out according to the method specified in JIS K7203. A test piece having a thickness of 3.2 mm was measured for a flexural modulus and a flexural strength at a span length of 50 mm at a loading rate of 1.5 mm/minute. The measurement temperature was 23° C. unless otherwise specified. When the test was carried out at a temperature other than 23° C., a sample was conditioned in a constant temperature bath at a predetermined temperature for 30 minutes before the test.

(4) Izod impact strength

Measured according to the method specified in JIS K7110. A test piece having a thickness of 3.2 mm was measured for a notched impact strength. The measurement temperature was 23° C. unless otherwise specified. When the measurement was carried out at a temperature other than 23° C., a sample was conditioned in a constant temperature bath at a predetermined temperature before the measurement.

(5) Penetration impact strength

A high rate impact tester (RIT-8000), supplied by Rheometrics Inc. (U.S.A.) was used. The deformation degree and stress of a flat test piece having a thickness of 3 mm were detected by fixing the test piece with a 2-inch circular holder and hitting a ⅝-inch impact probe (tip spherical surface: 5/16 inch R) against the test piece at a rate of 3 m/second, and a curve was drawn as shown in FIG. 1 on the basis of the resultant measurement values The penetration impact strength was evaluated by integrating the area along the curve.

One example of the measurement charts used in the evaluation of penetration impact strength is shown in FIG. 1, in which the abscissa axis indicates a displacement amount (D: mm) showing deformation of the test piece and, the ordinate axis indicates a stress (N: newton) to the displacement amount. Both of these values were continuously detected and continuously plotted in an X-Y plotter whereby said measurement chart was obtained.

A yield point energy was obtained by integrating areas of the deformation amount and the stress from the start of stress detection to a yield point of a material, and a total energy was obtained by integrating, areas of the displacement amount and the stress from the start portion to a breaking point.

The fracture state of a material was determined to be a ductile fracture or a brittle fracture by observing a test piece actually subjected to a fracture test.

The energy value required to yield a material was evaluated in terms of energy at a yield point, and the energy value required to fracture a material was evaluated in terms of total energy, and these values are shown in the unit of joule (J).

A sample was conditioned in a constant temperature bath attached to the apparatus. A test piece was placed in the constant temperature bath adjusted to a predetermined temperature and conditioned for 2 hours before the above test. The predetermined temperature was used as a measurement temperature.

(6) Heat distortion temperature

Measured according to the method specified in JIS K7207. The fiber stress was measured at 4.6 kg/cm$^2$.

(7) Rockwell hardness

Measured according to the method specified in JIS K7207. The thickness of a test piece was 3.2 mm, R was used as a steel ball, and the evaluation value was expressed on R scale.

(8) Graft amount of maleic anhydride and styrene

The graft amounts of maleic anhydride on each of the modified polypropylenes (A) and (B) and the modified polypropylene compositions (A') and (B') were determined by dissolving a small amount of a sample in hot xylene, forming a precipitate with anhydrous acetone to purify the sample, then redissolving the purified sample in xylene, and titrating the resultant solution with a methanol solution of NaOH while the solution was under heat (110° to 120° C.) and phenol-phthalein was used as an indicator.

The graft amount of the maleic anhydride in the modified rubbery substance (G) was determined by dissolving a small amount of a sample in toluene, forming a precipitate with anhydrous acetone to purify the sample, then redissolving the purified sample in toluene, and titrating the resultant solution with an ethanol solution of KOH while the solution was under heat (85° C.) and phenolphthalein was used as an indicator.

The graft amount of styrene was determined on the basis of the intensity of an absorption peak derived from substituted benzene rings observed in an infrared absorption spectrum of the above purified sample.

(9) Mooney viscosity

Measured according to the method specified in JIS K6300. The measurement temperature was 121° C.

(10) Number average molecular weight

Measured by gel permeation chromatography (GPC) under the following conditions.

GPC: type 150C, supplied by Waters,

Column: Shodex 80 MA, supplied by Showa Denko K.K.

Sample amount: 300 μl (polymer concentration: 0.2 wt.%)

Flow rate: 1 ml/min.

Temperature: 135° C.

Solvent: Trichlorobenzene

A calibration curve for the calculation of the number average molecular weight was prepared by a conventional method using standard polystyrene supplied by Tohsoh Corp. A data processor CP-8 Model III supplied by Tohsoh Corp. was used for data processing.

(11) Ethylene content

The ethylene content was determined by preparing a press sheet, measuring it for an infrared absorption spectrum, and using a calibration curve from absorbances of characteristic absorptions of methyl (—CH$_3$) and methylene (—CH$_2$—) which were observed in the infrared absorption spectrum.

The above test pieces for determining the physical properties were prepared under the following injection molding conditions unless otherwise specified. Compositions were dried in a hot-air dryer at 120° C. for 2 hours and injection-molded with an injection molding machine, model IS150 E-V, supplied by Toshiba Machinery Co., Ltd. at a molding temperature of 220° C. and a mold-cooling temperature of 50° C. for an injection time of 15 seconds and a cooling time of 30 seconds.

Compositions described below were produced under the following conditions unless otherwise specified. A predetermined amount of each of the components for the compositions was weighed, and the components were preliminarily mixed uniformly with a Henschel mixer, and then kneaded in a twin-screw continuous kneading machine (model TEX44 SS 30BW-2V, supplied by Japan Steel Works, Ltd.) at an extrusion rate of 30 kg/hour, a resin temperature of 240° C. and a screw revolution rate of 350/minute while suction was carried out through a vent.

EXAMPLES 1-3, COMPARATIVE EXAMPLES 1 AND 2 (TABLE 1-1 AND 1-2)

A modified polypropylene was prepared in the following manner. A propylene homopolymer, as a material, prepared by a slurry polymerization method according to the process described in JP-A-60-28405, which had a melt flow rate of 1.3 g/10 minutes, an intrinsic viscosity, measured in tetralin at 135° C., of 2.45 dl/g, a 20° C. cold xylene-soluble content of 2.9% by weight, a boiling heptane-soluble content of 6.7% by weight, and an isotactic pentad, in its boiling heptane-insoluble portion, of 0.952 was modified in the following manner.

100 Parts by weight of the propylene homopolymer as a material, 1.0 part by weight of maleic anhydride, 0.6 part by weight of a radical initiator prepared by allowing a propylene homopolymer to support 8% by weight of 1,3-bis(t-butylperoxyisopropyl)benzene (Sanperox ®-TY1.3 supplied by Sanken Kako Co., Ltd.) and 0.1 part by weight of Irganox ® 1010 (supplied by Ciba Geigy) as a stabilizer were uniformly mixed with a Henschel mixer. The resultant mixture was melt-kneaded with a twin-screw extruder, model TEX 44 SS-30BW-2V supplied by Japan Steel Works Ltd., at a temperature of 220° C. for an average residence time of 1.5 minutes to give a maleic anhydride-modified polypropylene (A) having a maleic anhydride graft amount of 0.08% by weight and a melt flow rate of 36 (g/10 minutes). This modified polypropylene (A) is abbreviated as M-PP-1 hereinafter.

A modified polypropylene (B) was prepared by using the same materials as those for M-PP-1 and repeating the above procedures for M-PP-1 except that 0.5 part by weight of styrene was used in addition, whereby there was obtained a meleic anhydride- and styrene-modified polypropylene (B) having a maleic anhydride graft amount of 0.15% by weight, a styrene graft amount of 0.07% by weight and a melt flow rate of 21 g/10 minutes. This modified polypropylene (B) is abbreviated as MS-PP-1 hereinafter.

An epoxy group-containing copolymer (E) was prepared in the following manner. A terpolymer having a melt flow rate of 21 g/10 minutes (190° C., load: 2.16 kg) and having an ethylene/methyl methacrylate/glycidyl methacrylate weight ratio of 65/15/20 (% by weight) was prepared according to a high-pressure radical polymerization method according to the process described in JP-A-47-23490 and JP-A-48-11888.

This epoxy group-containing copolymer is abbreviated as E-MA-GMA-1.

A bipolymer having a melt flow rate of 20 g/10 minutes (190° C., load: 2.16 kg) and having an ethylene/- methyl methacrylate weight ratio of 65/35 (% by weight) was prepared in the same manner as above. This bipolymer is abbreviated as E-MA 1 hereinafter.

A polypropylene (C) was prepared in the following manner. A propylene homopolymer having a melt flow rate of 10.0 g/10 minutes, an intrinsic viscosity, measured in tetralin at 135° C., of 1.60 dl/g, a 20° C. cold xylene-soluble content of 2.4% by weight, a boiling heptane-soluble content of 6.4% by weight, and an isotactic pentad, in its boiling heptane-insoluble portion, of 0.953 was prepared by a slurry polymerization method according to the process described in JP-A-60-28405. This polypropylene is abbreviated as PP-1 hereinafter.

The above starting materials were mixed in proportions as shown in Tables 1-1 and 1-2, and compositions were produced under predetermined conditions. Test pieces were prepared from the compositions under predetermined injection conditions, and evaluated according to the foregoing methods. Tables 2-1 and 2-2 show the results of the evaluation of the physical properties of the test pieces.

Tables 2-1 and 2-2 show that the test pieces obtained in Examples 1 to 3 of the present invention had remarkably improved Izod impact strength and penetration impact strength over the test piece whose polypropylene was not modified, obtained in Comparative Example 1, and the test piece which contained no epoxy group-containing copolymer, obtained in Comparative Example 2.

EXAMPLES 4 AND 5, AND COMPARATIVE EXAMPLE 3

A modified rubbery substance (G) was prepared in the following manner. 100 Parts by weight of pellets of an ethylene-propylene rubber having a number average molecular weight of 60,000 and an ethylene content of 78% by weight, 1.0 part by weight of maleic anhydride and 0.6 part by weight of a radical initiator prepared by allowing a propylene homopolymer to support 8% by weight of 1,3-bis(t-butylperoxyisopropyl)benzene (Sanperox ®-TY1.3 supplied by Sanken Kako Co., Ltd.) were uniformly mixed with a Henschel mixer, and the resultant mixture was melt-kneaded in a twin-screw extruder, TEX 44 SS 30BW-2V, supplied by Japan Steel Works Ltd., under a nitrogen atmosphere at a kneading temperature of 250° C. and an extrusion rate of 18 kg/hour to prepare a modified ethylene-propylene copolymer rubber having a maleic anhydride graft amount of 0.2% by weight, and a Mooney viscosity $(ML_{1+4}\ 121°\ C.)$, at 121° C., of 60. This modified ethylene-propylene copolymer rubber is abbreviated as M-EPR-1.

A modified polypropylene (A) and an epoxy group-containing copolymer (E) used in these Examples were the same as those used in Example 1.

The above starting materials were mixed in proportions shown in Tables 1-1 and 1-2, and compositions were prepared under predetermined conditions. Test pieces were prepared from the compositions under predetermined injection conditions, and evaluated according to the foregoing methods. Tables 2-1 and 2-2 show the results of the evaluation of the physical properties of the test pieces.

Tables 2-1 and 2-2 show that the test pieces obtained in Examples 4 and 5 of the present invention had remarkably improved Izod impact strength and penetration impact strength over the test piece which contained no epoxy group-containing copolymer, obtained in Comparative Example 3.

EXAMPLES 6-9, AND COMPARATIVE EXAMPLE 4

A modified rubbery substance (G) was prepared in the following manner. Example 4 was repeated except that 0.5 part by weight of styrene was used, whereby there was obtained a modified ethylene-propylene copolymer rubber having a maleic anhydride graft amount of 0.25% by weight, a styrene graft amount of 0.09% by weight and a Mooney viscosity $(ML_{1+4}\ 121°\ C.)$, at 121° C., of 65.

The above modified ethylene-propylene copolymer rubber is abbreviated as MS-EPR-1 hereinafter. A modified polypropylene (A) and an epoxy group-containing copolymer (E) used in these Examples were the same as those used in Example 2, and a polypropylene (C) used in these Examples was the same as that used in Example 3.

The above starting materials were mixed in proportions shown in Tables 1-1 and 1-2, and compositions were prepared under predetermined conditions. Test pieces were prepared from the compositions under predetermined injection conditions, and evaluated according to the foregoing methods. Tables 2-1 and 2-2 show the results of the evaluation of the physical properties of the test pieces.

Tables 2-1 and 2-2 show that the test pieces obtained in Examples 6 to 9 of the present invention had remarkably improved Izod impact strength and penetration impact strength over the test piece which contained no epoxy group-containing copolymer, obtained in Comparative Example 4.

EXAMPLE 10-11 AND COMPARATIVE EXAMPLE 5

A modified polypropylene composition (A') was prepared in the following manner.

A polypropylene as a material used in these Examples was the same as that used in Example 1, and a rubbery substance as a starting material used in these Examples was the same as that used in Example 4. The polypropylene/rubbery substance mixing ratios in these Examples were 81.6/18.4 and 71.4/28.6.

100 Parts by weight of a polypropylene as a material and an ethylene-propylene copolymer rubber, 1.0 part by weight of maleic anhydride and 0.6 part by weight of a radical initiator prepared by allowing a propylene homopolymer to support 8% by weight of 1,3-bis(t-butyl-peroxyisopropyl)benzene (Sanperox ®-TY1.3 supplied by Sanken Kako Co., Ltd.) were uniformly mixed with a Henschel mixer, and the resultant mixture was melt-kneaded in a twin-screw extruder, TEX 44 SS 30EW-2V, supplied by Japan Steel Works Ltd., at a temperature of 220° C. for an average residence time of 1.5 minutes to give a modified polypropylene composition (A') having a maleic anhydride graft amount of 0.15% by weight and a melt flow rate of 19 g/10 minutes and another modified polypropylene composition (A') having a maleic anhydride graft amount of 0.16% by weight and a melt flow rate of 15 g/10 minutes.

The above modified polypropylene compositions (A') are abbreviated as M-PP/EPR-1 and M-PP/EPR-2, respectively, hereinafter.

An epoxy group-containing copolymer (E) used in these Examples were the same as that used in Example 1, and an ethylene-methyl methacrylate bipolymer used in these Examples were the same as that used in Comparative Example 2.

The above starting materials were mixed in proportions shown in Tables 1-1 and 1-2, and compositions were prepared in the same way as in Example 4. Test pieces were prepared from the compositions under predetermined injection conditions, and evaluated according to the foregoing methods. Tables 2-1 and 2-2 show the results of the evaluation of the physical properties of the test pieces.

EXAMPLES 12-13, AND COMPARATIVE EXAMPLE 6

A modified polypropylene composition (B') was prepared in the following manner. Examples 11 and 12 were repeated except that 0.5 part by weight of styrene was used, whereby there were obtained a modified polypropylene composition (B') having a maleic anhydride graft amount of 0.18% by weight, a styrene graft amount of 0.1% by weight and a melt flow rate of 17 g/10 minutes and another modified polypropylene composition (B') having a maleic anhydride graft amount of 0.19% by weight, a styrene graft amount of 0.11% by weight and a melt flow rate of 13 g/10 minutes.

The above modified polypropylene compositions (B') are abbreviated as MS-EPR-1 and MS-PP/EPR-2 hereinafter, respectively. An epoxy group-containing copolymer (E) used in these Examples was the same as that used in Example 1, and an ethylene-methyl methacrylate bipolymer used in these Examples was the same as that used in Comparative Example 2.

The above starting materials were mixed in proportions shown in Tables 1-1 and 1-2, and compositions were prepared in the same way as in Example 4. Test pieces were prepared from the compositions under predetermined injection conditions, and evaluated according to the foregoing methods. Tables 2-1 and 2-2 show the results of the evaluation of the physical properties of the test pieces.

EXAMPLE 14

A composition was prepared in the same manner as in Example 13 except for the use of an ethylene-vinyl acetate-glycidyl methacrylate terpolymer having an ethylene/vinyl acetate/glycidyl methacrylate weight ratio of 85/5/10 (% by weight) and a melt flow rate of 7 g/10 minutes (to be abbreviated as E-VA-GMA-1 hereinafter), prepared in the same manner as in Example 1. Test pieces were prepared from the composition under predetermined injection conditions, and evaluated according to the foregoing methods. Tables 2-1 and 2-2 show the results of the evaluation of the physical properties of the test pieces.

EXAMPLE 15

A modified polypropylene composition (B') was prepared in the following manner.

Example 12 was repeated except that the same polypropylene and rubbery substance as those used in Example were used in a mixing ratio of 64.1/35.9, whereby there was obtained a modified polypropylene composition having a maleic anhydride graft amount of 0.2% by weight, a styrene graft amount of 0.12% by weight and melt flow rate of 11.0 g/10 minutes.

The above modified polypropylene composition is abbreviated as MS-PP/EPR-3 hereinafter.

An epoxy group-containing copolymer (E) and a polypropylene (C) used in this Example were the same as those used in Example 3.

The above starting materials were mixed in proportions as shown in Table 1-1, and a composition was prepared in the same manner as in Example 4, and evaluated.

Table 2-1 shows the results of the evaluation.

EXAMPLE 16

A co-modified polypropylene/rubbery substance was prepared by repeating Example 13 except for the use, as a rubbery substance, of a styrene-ethylene-butylene-styrene block copolymer having a number average molecular weight of 85,000, a styrene block whose number average molecular weight was 50,000, an ethylene-styrene block whose number average molecular weight was 35,000 and a styrene/ethylene-butylene block weight ratio of 30/70 (KRATON ®-G 1657, supplied by Shell Chemical). The resultant co-modified polypropylene/rubbery substance had a maleic anhydride graft amount of 0.20% by weight and a melt flow rate of 13.1 g/10 minutes.

The above co-modified polypropylene/rubbery substance is abbreviated as MS-PP/SEBS-1 hereinafter.

An epoxy group-containing copolymer (E) used in this Example was the same as that used in Example 1.

The above starting materials were mixed in proportions as shown in Table 1-1, and a composition was prepared in the same manner as in Example 4, and evaluated on its physical properties.

Table 2-1 shows the results of the evaluation.

EXAMPLE 17

A modified polypropylene composition (B') was prepared in the following manner.

Example 12 was repeated except for the use, as materials, of the same polypropylene and rubbery substance as those used in Example 4 in a mixing ratio of 51/49, whereby there was obtained a modified polypropylene composition having a maleic anhydride graft amount of 0.21% by weight, a styrene graft amount of 0.11% by weight and a melt flow rate of 7.1 (g/10 minutes). This modified polypropylene composition is abbreviated as MS-PP/EPR-4 hereinafter.

An epoxy group-containing copolymer (E) used in this Example was the same as that used in Example 1.

The above starting materials were mixed in proportions as shown in Table 1-1, and a composition was prepared in the same manner as in Example 4, and evaluated.

Table 2-1 shows the results of the evaluation.

EXAMPLE 18

A composition was prepared by repeating Example 13 except that benzyldimethylamine (Sumicure ® BD, supplied by Sumitomo Chemical Co., Ltd.) as a basic compound (H) was incorporated, and the composition was evaluated on its physical properties. Table 2-1 shows the results of the physical properties evaluation.

The composition obtained in Example 13, to which the basic compound (H) had not been incorporated, exhibited excellent physical properties, and the composition obtained in this Example, to which the basic compound (H) had been incorporated, had further improved Izod impact strength and penetration impact strength over the composition obtained in Example 13.

COMPARATIVE EXAMPLES 7-9

M-PP-1, M-PP/EPR-1 and E-MA-GMA were individually injection-molded as shown in Table 1-2 under predetermined conditions to prepare test pieces, and the test pieces were evaluated for their physical properties according to the foregoing methods. Table 2-2 shows the results of the evaluation. Those test pieces of Comparative Examples 7 and 8 to which an epoxy group-containing copolymer had not been incorporated were very poor in Izod impact strength and penetration impact strength as compared with the test pieces of Examples 1 and 10. The test piece of Comparative Example 9 which contained an epoxy group-containing copolymer alone was very poor in stiffness and heat resistance.

The thermoplastic resin composition according to the present invention not only exhibits excellent processability but also produces a remarkable effect in that it gives excellent physical properties over those of molded articles produced from each of polymers which constitutes the thermoplastic resin composition of the present invention.

The novel resin composition provided by the present invention can be easily processed into molded articles, films and sheets by a molding method generally used for thermoplastic resins such as injection molding, extrusion molding, etc. and can give products which have well-balanced properties of stiffness, heat resistance, impact resistance, scratch resistance, coatability, oil resistance, chemical resistance, water resistance, etc., and which are excellent in appearance, uniformity and smoothness. The thermoplastic resin composition of the present invention is particularly suitable for use where well-balanced properties of stiffness, heat resistance, impact resistance, and low-temperature impact resistance are required.

TABLE 1-1

| Component No. | Modified polypropylene (A), (B), (A') or (B'), | (part by weight) | Polypropylene (C) | (part by weight) | Epoxy group-containing copolymer (E) | (part by weight) | Modified rubbery substance (G) | (part by weight) | Basic compound (H) | (part by weight) |
|---|---|---|---|---|---|---|---|---|---|---|
| Example 1 | M-PP-1, | 90 | — | | E-MA-GMA-1, | 10 | — | | — | |
| Example 2 | MS-PP-1, | 90 | — | | E-MA-GMA-1, | 10 | — | | — | |
| Example 3 | MS-PP-1, | 70 | PP-1, | 20 | E-MA-GMA-1, | 10 | — | | — | |
| Example 4 | M-PP-1, | 80 | — | | E-MA-BMA-1, | 2 | M-EPR-1, | 18 | — | |
| Example 5 | M-PP-1, | 70 | — | | E-MA-BMA-1, | 2 | M-EPR-1, | 28 | — | |
| Example 6 | MS-PP-1, | 80 | — | | E-MA-GMA-1, | 2 | MS-EPR-1, | 18 | — | |
| Example 7 | MS-PP-1, | 70 | — | | E-MA-GMA-1, | 2 | MS-EPR-1, | 28 | — | |
| Example 8 | MS-PP-1, | 70 | — | | E-MA-GMA-1, | 5 | MS-EPR-1, | 23 | — | |
| Example 9 | MS-PP-1, | 50 | PP-1, | 20 | E-MA-GMA-1, | 5 | MS-EPR-1, | 28 | — | |
| Example 10 | M-PP/EPR-1, | 98 | — | | E-MA-GMA-1, | 2 | — | | — | |
| Example 11 | M-PP/EPR-2, | 98 | — | | E-MA-GMA-1, | 2 | — | | — | |
| Example 12 | MS-PP/EPR-1, | 98 | — | | E-MA-GMA-1, | 2 | — | | — | |
| Example 13 | MS-PP/EPR-2, | 98 | — | | E-MA-GMA-1, | 2 | — | | — | |
| Example 14 | MS-PP/EPR-2, | 98 | — | | E-VA-GMA-1, | 2 | — | | — | |
| Example 15 | MS-PP/EPR-3, | 78 | PP-1, | 20 | E-MA-GMA-1, | 2 | — | | — | |
| Example 16 | MS-PP/SEBS-1, | 98 | — | | E-MA-GMA-1, | 2 | — | | — | |
| Example 17 | MS-PP/EPR-4, | 98 | — | | E-MA-GMA-1, | 2 | — | | — | |
| Example 18 | MS-PP/EPR-2, | 98 | — | | E-MA-GMA-1, | 2 | — | | Sumicure ®BD | 0.5 |

TABLE 1-2

| Component No. | Modified polypropylene (A), (B), (A') or (B'), | (part by weight) | Polypropylene (C) | (part by weight) | Epoxy group-containing copolymer (E) | (part by weight) | Modified rubbery substance (G) | (part by weight) | Basic compound (H) | (part by weight) |
|---|---|---|---|---|---|---|---|---|---|---|
| Comparative Example 1 | — | | PP-1, | 90 | E-MA-GMA-1, | 10 | — | | — | |
| Comparative Example 2 | M-PP-1, | 90 | — | | E-MA-1, | 10 | — | | — | |
| Comparative Example 3 | M-PP-1, | 80 | — | | — | | M-EPR-1, | 20 | — | |
| Comparative Example 4 | MS-PP-1, | 80 | — | | — | | MS-EPR-1, | 20 | — | |
| Comparative Example 5 | M-PP/EPR-1, | 98 | — | | E-MA-1, | 2 | — | | — | |
| Comparative Example 6 | MS-PP/EPR-1, | 98 | — | | E-MA-1, | 2 | — | | — | |

TABLE 1-2-continued

| Component No. | Modified polypropylene (A), (B), (A') or (B'), | (part by weight) | Polypropylene (C) | (part by weight) | Epoxy group-containing copolymer (E) | (part by weight) | Modified rubbery substance (G) | (part by weight) | Basic compound (H) | (part by weight) |
|---|---|---|---|---|---|---|---|---|---|---|
| Comparative Example 7 | M-PP-1, | 100 | — | | — | | — | | — | |
| Comparative Example 8 | M-PP/EPR-1, | 100 | — | | — | | — | | — | |
| Comparative Example 9 | — | | — | | E-MA-GMA-1, | 100 | — | | — | |

TABLE 2-1

| Physical properties No. | Melt flow rate (g/10 min) | Tensile properties | | Flexural properties | | Izod impact strength | | Penetration impact strength (YE/TE)*1 −15° C. (J: Joule) | Thermal deformation temperature (°C.) | Rockwell hardness $R_H$ |
|---|---|---|---|---|---|---|---|---|---|---|
| | | Strength at yield point (kg/cm²) | Elongation at break (%) | Elastic modulus (kg/cm²) | Strength (kg/cm²) | 23° C. (kg·cm/cm) | −15° C. (kg·cm/cm) | | | |
| Example 1 | 28 | 286 | 70 | 14,600 | 358 | 13.1 | 3.5 | 15/19 (B) | 129 | 99 |
| Example 2 | 20 | 288 | 60 | 14,700 | 359 | 15.3 | 3.7 | 16/22 (B) | 131 | 98 |
| Example 3 | 19 | 289 | 60 | 14,800 | 360 | 14.2 | 3.4 | 17/21 (B) | 132 | 98 |
| Example 4 | 12.7 | 238 | 190 | 11,800 | 285 | 20.2 | 4.5 | 26/35 (B) | 119 | 84 |
| Example 5 | 6.8 | 193 | 240 | 9,200 | 212 | 26.1 | 7.1 | 25/43 (D) | 109 | 66 |
| Example 6 | 11.5 | 240 | 180 | 12,200 | 288 | 19.0 | 4.1 | 25/31 (B) | 120 | 85 |
| Example 7 | 9.2 | 195 | 230 | 9,400 | 217 | 24.1 | 6.9 | 24/42 (D) | 110 | 67 |
| Example 8 | 8.6 | 197 | 210 | 9,700 | 219 | 22.9 | 6.2 | 23/41 (D) | 112 | 68 |
| Example 9 | 7.8 | 196 | 220 | 9,600 | 219 | 23.0 | 6.4 | 23/40 (D) | 111 | 68 |
| Example 10 | 13.2 | 239 | 200 | 11,600 | 280 | 44.5 | 7.8 | 26/47 (D) | 119 | 83 |
| Example 11 | 7.2 | 188 | >500 | 8,900 | 212 | 80 | 14.8 | 24/46 (D) | 110 | 66 |
| Example 12 | 11.6 | 243 | 280 | 11,800 | 282 | 42.1 | 7.0 | 27/46 (D) | 120 | 84 |
| Example 13 | 6.8 | 190 | >500 | 9,000 | 214 | 77 | 13.6 | 24/44 (D) | 109 | 66 |
| Example 14 | 6.2 | 193 | >500 | 9,600 | 220 | 61 | 11.5 | 24/42 (D) | 110 | 68 |
| Example 15 | 7.5 | 192 | >500 | 9,400 | 217 | 68 | 12.7 | 23/43 (D) | 111 | 67 |
| Example 16 | 6.7 | 189 | >500 | 8,900 | 212 | 85 | 16.1 | 24/46 (D) | 108 | 65 |
| Example 17 | 6.2 | 125 | >500 | 4,800 | — | 95 | 55 | 28/51 (D) | — | — |
| Example 18 | 6.1 | 191 | >500 | 9,100 | 213 | 81 | 14.0 | 24/45 (D) | 110 | 67 |

Note)
*1 Penetration impact strength. YE denotes yield point energy. TE denotes total energy, (D) and (B) indicate the states of fracture: (D): ductile fracture, (B): brittle fracture.

TABLE 2-2

| Physical properties No. | Melt flow rate (g/10 min) | Tensile properties | | Flexural properties | | Izod impact strength | | Pentration impact strength (YE/TE)*1 −15° C. (J: Joule) | Thermal deformation temperature (°C.) | Rockwell hardness $R_H$ |
|---|---|---|---|---|---|---|---|---|---|---|
| | | Strength at yield point (kg/cm²) | Elongation at break (%) | Elastic modulus (kg/cm²) | Strength (kg/cm²) | 23° C. (kg·cm/cm) | −15° C. (kg·cm/cm) | | | |
| Comparative Example 1 | 13.1 | 285 | 40 | 14,500 | 356 | 3.2 | 3.5 | 2/3 (B) | 130 | 98 |
| Comparative Example 2 | 22.3 | 283 | 50 | 13,900 | 353 | 3.3 | 1.7 | 3/8 (B) | 129 | 97 |
| Comparative Example 3 | 21.6 | 231 | 70 | 12,300 | 288 | 11.5 | 2.9 | 17/24 (B) | 121 | 85 |
| Comparative Example 4 | 17.5 | 234 | 60 | 12,500 | 287 | 10.3 | 2.6 | 15/17 (B) | 123 | 85 |
| Comparative Example 5 | 18.0 | 241 | 80 | 12,200 | 289 | 16.2 | 3.1 | 20/27 (B) | 121 | 84 |
| Comparative Example 6 | 17.0 | 242 | 70 | 12,400 | 290 | 15.1 | 3.0 | 19/25 (B) | 122 | 85 |
| Comparative Example 7 | 36 | 300 | 40 | 14,500 | 390 | 3.0 | 1.5 | 2/5 (B) | 130 | 99 |
| Comparative Example 8 | 19 | 255 | 70 | 13,800 | 300 | 14.0 | 2.9 | 19/26 (B) | 123 | 87 |
| Comparative Example 9 | 21 (190° C.) | 100> | >500 | 300> | 50> | not destroyed | not destroyed | 30/31 (D) | 30> | 5> |

What is claimed is:

1. A thermoplastic resin composition consisting of (i) 100 parts by weight of at least one modified polypropylene resin or resin composition (D) selected from the group consisting of:

a modified polypropylene (A) prepared by graft-polymerization of an unsaturated carboxylic acid or a derivative thereof onto a polypropylene (C), a modified polypropylene (B) prepared by graft-polymerization of an unsaturated carboxylic acid or a derivative thereof and an unsaturated aromatic monomer onto a polypropylene (C), a modified polypropylene composition (A') prepared by graft-polymerization of an unsaturated carboxylic acid or a derivative thereof onto a mixture of a polypropylene (C) with a rubbery substance (F), and a modified polypropylene composition (B') prepared by graft-polymerization of an unsaturated carboxylic acid or a derivative thereof and a unsaturated aromatic monomer onto a mixture of a polypropylene (C) with a rubbery substance (F);

(ii) 0.1 to 300 parts by weight of an epoxy group-containing copolymer (E) which is a copolymer selected from the group consisting of a copolymer composed of an unsaturated epoxy compound and ethylene, and a copolymer composed of an unsaturated epoxy compound, ethylene and an ethylenically unsaturated compound other than ethylene; and (iii) optionally one or more suitable additives or auxiliary agents.

2. The thermoplastic resin composition according to claim 1, wherein the suitable additives or auxiliary agents are selected from the group consisting of: an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, a flame retardant, a flat retardant auxiliary, a dye, a pigment and a weathering resistance-imparting agent.

3. A thermoplastic resin composition according to claim 1, wherein the modified polypropylene resin or resin composition (D) is the modified polypropylene (A) prepared by graft-polymerization of an unsaturated carboxylic acid or a derivative thereof onto a polypropylene (C).

4. A thermoplastic resin composition according to claim 3, wherein the unsaturated carboxylic acid or a derivative thereof is maleic anhydride and the unsaturated aromatic monomer is styrene.

5. A thermoplastic resin composition according to claim 1, wherein the modified polypropylene resin or resin composition (D) is the modified polypropylene (B) prepared by graft-polymerization of an unsaturated carboxylic acid or a derivative thereof an unsaturated aromatic monomer onto a polypropylene (C).

6. A thermoplastic resin composition according to claim 5, wherein the unsaturated carboxylic acid or a derivative thereof is maleic anhydride.

7. A thermoplastic resin composition according to claim 1, wherein the modified polypropylene resin or resin composition (D) is the modified polypropylene composition (A') prepared by graft-polymerization of an unsaturated carboxylic acid or a derivative thereof onto a mixture of a polypropylene (C) with a rubbery substance (F).

8. A thermoplastic resin composition according to claim 7, wherein the unsaturated carboxylic acid or a derivative thereof is maleic anhydride and the unsaturated aromatic monomer is styrene.

9. A thermoplastic resin composition according to claim 1, wherein the modified polypropylene resin or resin composition (D) is the modified polypropylene composition (B') prepared by graft-polymerization of an unsaturated carboxylic acid or a derivative thereof and an unsaturated aromatic monomer onto a mixture of a polypropylene (C) with a rubbery substance (F).

10. A thermoplastic resin composition consisting of (i) 100 parts by weight of at least one modified polypropylene resin or resin composition (D) selected from the group consisting of:

a modified polypropylene (A) prepared by graft-polymerization of an unsaturated carboxylic acid or a derivative thereof onto a polypropylene (C), a modified polypropylene (B) prepared by graft-polymerization of an unsaturated carboxylic acid or a derivative thereof and an unsaturated aromatic monomer onto a polypropylene (C), a modified polypropylene composition (A') prepared by graft-polymerization of an unsaturated carboxylic acid or a derivative thereof onto a mixture of a polypropylene (C) with a rubbery substance (F), and a modified polypropylene composition (B') prepared by graft-polymerization of an unsaturated carboxylic acid or a derivative thereof and an unsaturated aromatic monomer onto a mixture of a polypropylene (C) with a rubbery substance (F);

(ii) 0.1 to 300 parts by weight of an epoxy group-containing copolymer (E) which is a copolymer selected from the group consisting of a copolymer composed of an unsaturated epoxy compound and ethylene, and a copolymer composed of an unsaturated epoxy compound, ethylene and an ethylenically unsaturated compound other than ethylene;

(iii) a polypropylene (C); and (iv) optionally one or more suitable additives or auxiliary agents.

11. The thermoplastic resin composition according to claim 10, wherein the suitable additives or auxiliary agents are selected from the group consisting of: an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, a flame retardant, a flame retardant auxiliary, a dye, a pigment and a weathering resistance-imparting agent.

12. A thermoplastic resin composition according to claim 10, wherein the modified polypropylene resin or resin composition (D) is the modified polypropylene (A) prepared by graft-polymerization of an unsaturated carboxylic acid or a derivative thereof onto a polypropylene (C).

13. A thermoplastic resin composition according to claim 12, wherein the unsaturated carboxylic acid or a derivative thereof is maleic anhydride and the unsaturated aromatic monomer is styrene.

14. A thermoplastic composition according to claim 10, wherein the modified polypropylene resin or resin composition (D) is the modified polypropylene (B) prepared by graft-polymerization of an unsaturated carboxylic acid or a derivative thereof and an unsaturated aromatic monomer onto a polypropylene (C).

15. A thermoplastic resin composition according to claim 14, wherein the unsaturated carboxylic acid or a derivative thereof is maleic anhydride.

16. A thermoplastic resin composition according to claim 10, wherein the modified polypropylene resin or resin composition (D) is the modified polypropylene composition (A') prepared by graft-polymerization of an unsaturated carboxylic acid or a derivative thereof onto a mixture of a polypropylene (C) with a rubbery substance (F).

17. A thermoplastic resin composition according to claim 10, wherein the modified polypropylene resin or resin composition (D) is the modified polypropylene composition (B′) prepared by graft-polymerization of an unsaturated carboxylic acid or a derivative thereof and an unsaturated aromatic monomer onto a mixture of a polypropylene (C) with a rubbery substance (F).

18. A thermoplastic resin composition according to claim 10, wherein the epoxy group-containing copolymer (E) is a copolymer composed of an unsaturated epoxy compound and ethylene or a copolymer composed of an unsaturated epoxy compound, ethylene and an ethylenically unsaturated compound other than ethylene.

19. A thermoplastic resin composition according to claim 16, wherein the unsaturated carboxylic acid or a derivative thereof is maleic anhydride and the unsaturated aromatic monomer is styrene.

20. A thermoplastic resin composition consisting of:
(i) 100 parts by weight of at least one modified polypropylene resin or resin composition (D) selected from the group consisting of:
   a modified polypropylene (A) prepared by graft-polymerization of an unsaturated carboxylic acid or a derivative thereof onto a polypropylene (C),
   a modified polypropylene (B) prepared by graft-polymerization of an unsaturated carboxylic acid or a derivative thereof and an unsaturated aromatic monomer onto a polypropylene (C),
   a modified polypropylene composition (A′) prepared by graft-polymerization of an unsaturated carboxylic acid or a derivative thereof onto a mixture of a polypropylene (C) with a rubbery substance (F), and
   a modified polypropylene composition (B′) prepared by graft-polymerization of an unsaturated carboxylic acid or a derivative thereof and an unsaturated aromatic monomer onto a mixture of a polypropylene (C) with a rubbery substance (F);
(ii) 0.1 to 300 parts by weight of an epoxy group-containing copolymer (E) which is a copolymer selected from the group consisting of a copolymer composed of an unsaturated epoxy compound and ethylene, and a copolymer composed of an unsaturated epoxy compound, ethylene and an ethylenically unsaturated compound other than ethylene,
(iii) at least one member selected from the group consisting of 0.1 to 300 parts by weight of at least one member selected from the group consisting of: a rubbery substance (F) and a modified rubbery substance (G) prepared by graft-polymerization of either an unsaturated carboxylic acid, a derivative or an unsaturated carboxylic acid, a combination of an unsaturated carboxylic acid with an unsaturated aromatic monomer, or a combination of a derivative of an unsaturated carboxylic acid with an unsaturated aromatic monomer, and not more than 5 parts by weight of a basic compound (H); and
(iv) optionally one or more suitable additives or auxiliary agents.

21. The thermoplastic resin composition according to claim 20, wherein the suitable additives or auxiliary agents are selected from the group consisting of: an antioxidant, a heat stabilizer, a light stabilizer, a nucleating agent, a lubricant, an antistatic agent, an inorganic or organic colorant, a rust preventive, a crosslinking agent, a foaming agent, a plasticizer, a fluorescent agent, a surface treating agent, a surface brightener, a flame retardant, a flame retardant auxiliary, a dye, a pigment and a weathering resistance-imparting agent.

22. A thermoplastic resin composition according to claim 20, wherein the modified polypropylene resin or resin composition (D) is the modified polypropylene (A) prepared by graft-polymerization of an unsaturated carboxylic acid or a derivative thereof onto a polypropylene (C).

23. A thermoplastic resin composition according to claim 22, wherein the unsaturated carboxylic acid or a derivative thereof is maleic anhydride.

24. A thermoplastic resin composition according to claim 23, wherein the rubbery substance used as a starting material is a selectively hydrogenated block copolymer rubber having an unsaturated aromatic polymer block and a conjugated diene block.

25. A thermoplastic resin composition according to claim 20, wherein the modified polypropylene resin or resin composition (D) is the modified polypropylene (B) prepared by graft-polymerization of an unsaturated carboxylic acid or a derivative thereof and an unsaturated aromatic monomer onto a polypropylene (C).

26. A thermoplastic resin composition according to claim 20, wherein a rubbery substance as a starting material for the rubbery substance (F) and the rubbery substance (G) prepared by graft-copolymerization of an unsaturated carboxylic acid, a derivative of an unsaturated carboxylic acid, a combination of an unsaturated carboxylic acid with an unsaturated aromatic monomer or a combination of a derivative of an unsaturated carboxylic acid with an unsaturated aromatic monomer is an ethylene-based copolymer rubber.

27. A thermoplastic resin composition according to claim 25, wherein the unsaturated carboxylic acid or a derivative thereof is maleic anhydride and the unsaturated aromatic monomer is styrene.

* * * * *